Figure 1:
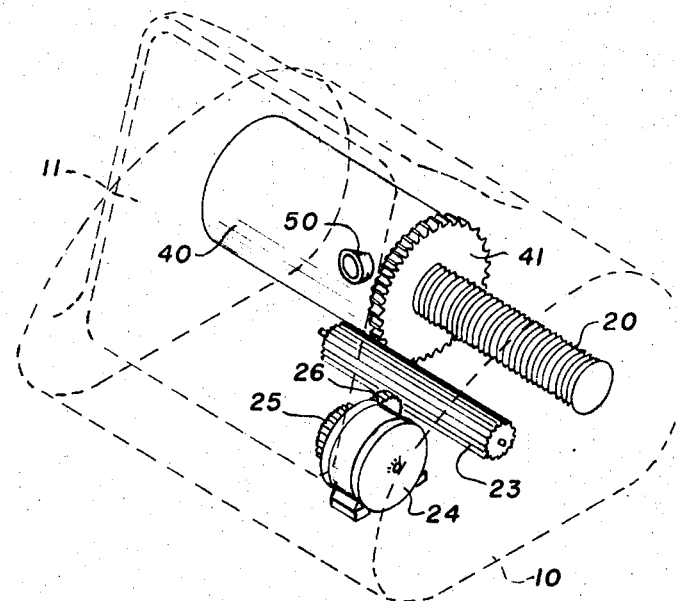

United States Patent [19]
Wiseman

[11] 3,746,440
[45] July 17, 1973

[54] MICROFILMED INFORMATION RETRIEVAL SYSTEM
[76] Inventor: Barry R. Wiseman, P. O. Box 37, Cassiar, British Columbia, Canada
[22] Filed: July 19, 1971
[21] Appl. No.: 163,733

[52] U.S. Cl. .................................. 353/108, 353/27
[51] Int. Cl. ............................................ G03b 23/10
[58] Field of Search ..................... 353/108, 110, 27, 353/25, 26, 102, 109, 25-27; 74/89.15

[56] References Cited
UNITED STATES PATENTS
2,216,512  10/1946  Fetter .................................. 353/25
3,440,610   4/1969  Pierrat .............................. 74/89.15
2,834,216   5/1958  Thompson ........................ 74/89.15
2,296,141   9/1942  Brown ................................ 353/25
3,117,491   1/1964  Stern .................................. 353/25

Primary Examiner—Louis R. Prince
Assistant Examiner—A. J. Mirabito
Attorney—Fetherstonhaugh & Co.

[57] ABSTRACT

A carrier for microfilmed information which comprises a surface such as a cylindrical surface upon which frames of microfilmed information are arranged in a spiral array. A reader is provided upon which a cylinder may be mounted, the reader comprising a screw threaded shaft co-operating with the cylinder so that the cylinder is rotated about the shaft and moved along it past a projector element.

3 Claims, 3 Drawing Figures

INVENTOR
BARRY R. WISEMAN

MICROFILMED INFORMATION RETRIEVAL SYSTEM

This invention is concerned with apparatus for storing and retrieving information.

A major communications problem of today is storing and accurately retrieving the vast amounts of information produced and currently recorded in print or on film. It is with this problem that this invention is concerned.

One development which has to a large extent reduced, if not solved, the problem of storage is microfilm which with the development of improved photographic techniques resulting in fine-grained films has allowed very small films to be made which can be projected through an appropriate optical magnifying system to a size from which that information can be used.

Unfortunately the retrieval of the information stored on such microfilms is not readily achieved and depends upon and has all the problems of, filing systems associated with conventional information storage systems.

It is proposed according to this information that there be provided a carrier for microfilmed information which has a surface on which a plurality of frames of microfilmed information are arranged in a spiral array and from which the information on the frames can be projected to be retrieved.

In one embodiment the carrier could be a cylinder with the frames arranged in a helical array around the cylindrical surface, or in another embodiment the carrier could be a disc with the frames in a spiral after the fashion of a gramaphone record. Another possibility is to have the frames on a flexible endless band.

It is to be appreciated that the retrieval of the information can be affected either by projecting the intelligence on the frames to a screen from which it can be read or the image can be projected onto a copying device.

With the arrangement according to this invention a projection device could be provided which would be movable relatively to the carrier to project a particular frame to where the information on that frame can be retrieved, i.e., it can be projected onto a screen.

A preferred embodiment would comprise a cylinder of transparent material upon the surface of which microfilms are printed and relatively to which a projecting device is movable axially to project the information on the frame located in front of the projector onto an associated screen.

A typical embodiment of the invention would comprise a cylinder with the frames of microfilmed information arranged in a helix around its cylindrical surface and a ring gear secured to the cylinder and co-operating with a long pinion the cylinder having a screw threaded collar mounted upon a screw threaded shaft having a similar pitch to the helix upon which the frames of microfilm are located so that as the pinion rotates the cylinder is moved along the screw threaded shaft and in front of a projecting device located within the cylinder. Thus, the frames on the cylinder would sequentially be projected onto a screen.

It will be appreciated that with such an arrangement and an appropriate gate in the projecting device a moving picture could be projected onto the screen if desired.

Clearly, by proper indexing of the position of the frame relative to a fixed point, rotation of the motor by a particular number of turns would accurately locate a particular frame for viewing or reproduction.

Obviously there are other methods of indexing, for example, one could take a reference point at say, one end of the cylinder and use two indexing devices, one to locate the frame relative to that end of the cylinder and the other to locate its angular displacement from some fixed point on the cylinder.

Figure 2:
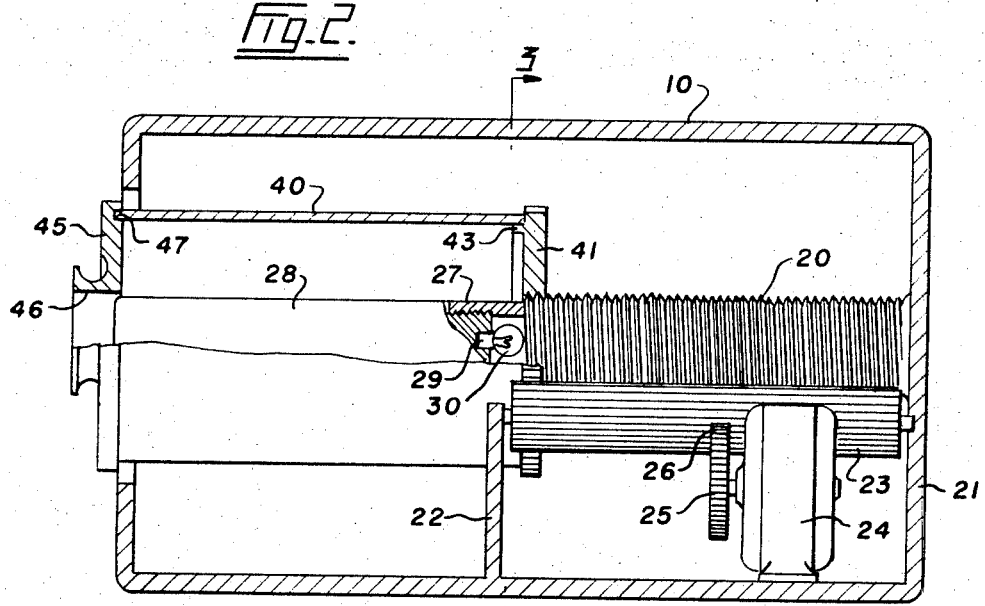
Figure 3:
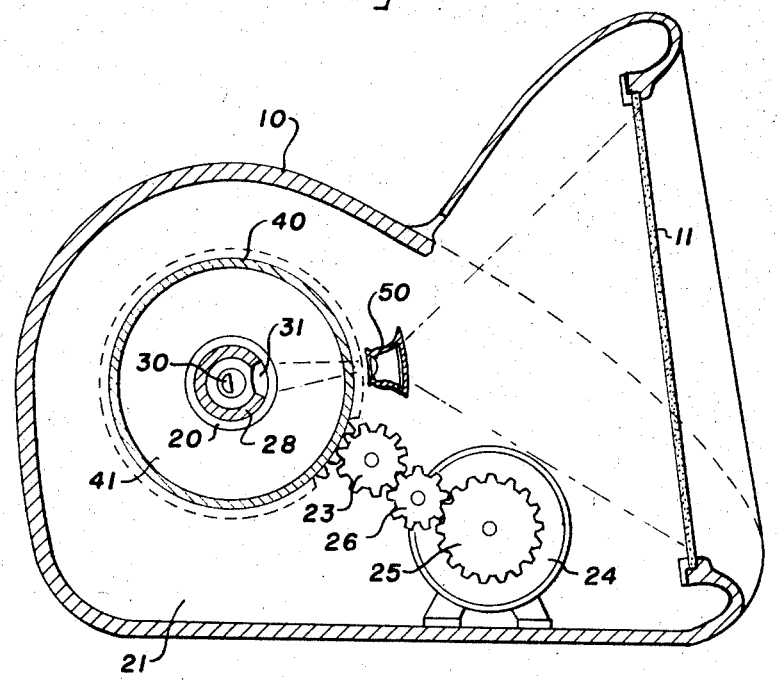

An embodiment of this invention is illustrated schematically in the accompany drawings in which FIG. 1 is a perspective view of the apparatus FIG. 2 is a vertical section of the apparatus in FIG. 1, and, FIG. 3 is a section on the line 3—3 on FIG. 2.

The embodiment of the invention in the drawings comprises a casing 10 which supports a screen 11 and contains the optical-mechanical system of the device.

Fixed to and projecting normally from a vertical sidewall 21 of the casing 10 is a screw threaded shaft 20 which serves as a guide for the information carrier in a manner described hereinafter. Journalled in the wall 21 and in a central partition wall 22 of the casing is a splined shaft 23 which serves as a drive pinion for the carrier. Mounted on the base of the casing 10 is an electric motor 24 and that motor carries a gear 25 which through another gear 26 drives the splined shaft 23.

The end of the screw threaded shaft 20 remote from the wall 21 terminates in a screw threaded socket 27 within which there is located a guide element 28 which has at that end adjacent to the shaft 20 a screw threaded male member for engagement in the socket 27. The guide 28 is a blind-ended tube and projecting axially from the blind end adjacent to the shaft 20 and towards the wall 21 of the casing there is a boss 29 within which a lamp 30 is supported upon the axis of the shaft 20. The socket portion 27 of the shaft 20 has an opening 31 within which is located a part of the optical system for projecting the information on the carrier.

The carrier according to this invention comprises a transparent cylinder 40 upon which frames of microfilm are printed. The frames of microfilm are arranged on that cylinder in a helical array, the pitch of the helix upon which the frames are located being substantially similar to the pitch of the screw thread on the shaft 20 or bearing a direct relationship to the pitch of the screw thread on shaft 20.

At the inner end of the cylinder as viewed in FIG. 2 there is a disc 41 which has a central screw threaded hole for co-operation with the screw threaded shaft 20 and has gear teeth formed along its outer periphery for co-operation with the splined shaft 23 so that as the splined shaft is rotated so is the disc 41 and that disc 41 is caused to move axially along the screw threaded shaft 20.

Towards the periphery of the disc 41 and on that side of the disc remote from the wall 21 there is formed an annular shoulder 43 upon which the cylinder 40 is secured. The other end of the cylindrical carrier is closed and supported by a disc 45 which has a central opening 46 of which the marginal edges co-operate with the guide 28 to support the cylinder in its axial movement along the shaft 20.

The end of the cylinder at that disc is supported in an annular groove 47 close to the periphery of the disc 45.

Appropriately supported in a position opposite to the opening 31 and to the lamp 30 is a projection system 50 which is arranged to project the image of a frame of microfilm in register with the system 50 and the lamp 30 onto screen 11.

It will be appreciated that a particular location on the cylinder 40 or frame on the cylinder 40 can be located either by a counter-mechanism counting the number of rotations of the motor 24 and hence the number of rotations of the cylinder 40 along the shaft 20 or an indexing device could measure simply axial movement of the cylinder along the shaft 20 and then, from some fixed reference point, the angular displacement of the cylinder from that reference point.

I claim:

1. Apparatus for recovering microfilmed information comprising a transparent cylinder having a surface on which microfilm is helically wound, said cylinder having an axial screw threaded opening in one end thereof and an exterior annular gear, a fixed screw threaded shaft supported for engagement in said screw threaded opening of said cylinder, a motor and a long pinion driven by said motor, said long pinion cooperating with said exterior annular gear, rotation of said long gear by said motor causing axial movement of said cylinder along said threaded shaft, said threaded shaft supporting an axially aligned guide having an opening, a lamp holder located within said guide, a lamp supported by said lamp holder opposite the guide opening, and an optical projection system including the lamp adapted to project light transmitted through said cylinder from said lamp to a screen.

2. Apparatus as claimed in claim 1, and including a disc on an end of the cylinder opposite the screw threaded shaft, said disc having a central opening slidably engaging the guide when the cylinder is moved along the screw threaded shaft.

3. Apparatus as claimed in claim 2, in which said screw threaded shaft has an end provided with an interiorally threaded socket, said guide having an axially projecting and exteriorally threaded boss lodged in said socket.

* * * * *